US012046436B2

(12) United States Patent
Tabell et al.

(10) Patent No.: US 12,046,436 B2
(45) Date of Patent: Jul. 23, 2024

(54) ARRAYED ELEMENT DESIGN FOR CHIP FUSE

(71) Applicant: Littelfuse, Inc., Chicago, IL (US)

(72) Inventors: Victor Oliver L. Tabell, Mandaluyong (PH); Albert Enriquez, Batangas (PH); Timothy Patel, Chicago, IL (US)

(73) Assignee: Littelfuse, Inc., Chicago, IL (US)

( * ) Notice: Subject to any disclaimer, the term of this patent is extended or adjusted under 35 U.S.C. 154(b) by 14 days.

(21) Appl. No.: 17/749,941

(22) Filed: May 20, 2022

(65) Prior Publication Data

US 2023/0377827 A1 Nov. 23, 2023

(51) Int. Cl.
*H01H 85/12* (2006.01)
*H01H 85/041* (2006.01)

(52) U.S. Cl.
CPC ..... *H01H 85/12* (2013.01); *H01H 2085/0414* (2013.01)

(58) Field of Classification Search
CPC ............. H01H 85/12; H01H 2085/0412-0414
See application file for complete search history.

(56) References Cited

U.S. PATENT DOCUMENTS 5,479,147 A * 12/1995 Montgomery ....... H01H 85/046 337/273
5,726,621 A * 3/1998 Whitney ............ H01H 85/0411 337/292
6,034,589 A * 3/2000 Montgomery ..... H01H 85/0411 337/296
7,304,366 B2 * 12/2007 Wu ..................... H01L 23/5256 365/96
2004/0190269 A1 * 9/2004 Makaran .............. H05K 1/0293 361/748
2005/0141164 A1 * 6/2005 Bender ................ H01H 85/046 361/104
2007/0120232 A1 * 5/2007 Greco ................. H01L 23/5258 257/E23.15
2009/0102595 A1 4/2009 Pachla
2015/0200067 A1 * 7/2015 Spaldon-Stewart ......................... H01H 85/165 337/290
2016/0005561 A1 * 1/2016 Enriquez ................ H01H 85/08 337/297

OTHER PUBLICATIONS

European Search Report for the EP Application No. 23170903.1, dated Sep. 27, 2023, 9 pages.

* cited by examiner

*Primary Examiner* — Jacob R Crum
(74) *Attorney, Agent, or Firm* — KDW FIRM PLLC

(57) ABSTRACT

A chip fuse includes a first terminal disposed on a first end of a fuse element array and a second terminal disposed on a second end of the fuse element array opposite the first end. The fuse element array includes multiple layers disposed in a stacked arrangement, each layer including a first terminal portion disposed within the first terminal, a second terminal portion disposed within the second terminal, a first fuse element portion orthogonal to and extending between the first terminal portion and the second terminal portion, and a second fuse element portion orthogonal to and extending between the first terminal portion and the second terminal portion. The first fuse element portion is adjacent the second fuse element portion.

20 Claims, 9 Drawing Sheets

ARRAYED ELEMENT DESIGN FOR CHIP FUSE

FIELD OF THE DISCLOSURE

Embodiments of the present disclosure relate to chip fuses and, more particularly, to improving $I^2t$ and breaking capacity characteristics of chip fuses.

BACKGROUND

Chip fuses feature a conductive fuse element that is typically deposited as a thick-film, electroplated, or thin-film layer onto a substrate material (e.g., ceramic, glass, or other). Chip fuses can provide overcurrent protection in small surface mount technology (SMT) packages, such as 1206, 0603, and 0402 SMT packages as defined by Electronic Industries Alliance (EIA) standards.

$I^2t$ is an expression of the available thermal energy resulting from current flow. With regard to fuses, the term is usually expressed as melting, arcing, and total clearing $I^2t$. The units for $I^2t$ are expressed in ampere-squared-seconds [$A^2s$]. Melting $I^2t$: the thermal energy required to melt a specific fuse element. Arcing $I^2t$: the thermal energy passed by a fuse during the arcing time. The magnitude of arcing $I^2t$ is a function of the available voltage and stored energy in the circuit. Total clearing $I^2t$: the thermal energy through the fuse from overcurrent inception until current is completely interrupted. Total clearing $I^2t$=(melting $I^2t$)+(arcing $I^2t$). $I^2t$ has two important applications to fuse selection. The first is pulse cycle withstand capability and the second is selective coordination. Interrupting rating (also known as breaking capacity or short circuit rating) is the maximum current which the fuse can safely interrupt at the rated voltage.

For most fuses, breaking capacities have an inverse correlation to $I^2t$—increasing cross sectional area to attain high $I^2t$ creates too much mass for the fuse to pass high breaking capacities, or vice-versa. The challenge from a design perspective has always been to find the balance between the two fuse characteristics, while still meeting all the other electrical and dimensional requirements.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a chip fuse in accordance with the present disclosure may include two terminals and a fuse element array. The first terminal is located on one end of the fuse element array while the second terminal is located on a second, opposite end of the fuse element array. The fuse element array includes multiple layers in a stacking arrangement with one another. Each of the multiple layers include two terminal portions and two fuse element portions. The first terminal portion is seated within in the first terminal and the second terminal portion is seated within in the second terminal. The first fuse element portion is perpendicular to and extending between the two terminal portions. The second fuse element portion is perpendicular to and extending between the two terminal portions. The first fuse element portion is adjacent the second fuse element portion.

Another exemplary embodiment of a chip fuse in accordance with the present disclosure may include multiple substrate layers and multiple fuse element layers. Each fuse element layer is sandwiched between two substrate layers. Each layer has two fuse element portions. The first fuse element portion connects between a first terminal and a second terminal. The second fuse element portion also connects between the first terminal and the second terminal. The first fuse element portion is parallel to the second fuse element portion.

DETAILED DESCRIPTION

A chip fuse is disclosed herein with arrayed elements. A fuse element array features one or more fuse elements, each of which is sandwiched between a substrate. Each fuse element consists of at least two fuse element portions disposed between terminals. The fuse element portions are thinner and narrower than those of legacy chip fuses having a single fuse element portion between terminals. As a result, when the chip fuse element ruptures, a larger proportion of energy is distributed along the sides of the component package rather than the top of the package. Further, the chip fuse is characterized as having higher Ft and breaking capacities than a comparable legacy chip fuse.

For the sake of convenience and clarity, terms such as “top”, “bottom”, “upper”, “lower”, “vertical”, “horizontal”, “lateral”, “transverse”, “radial”, “inner”, “outer”, “left”, and “right” may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1B:
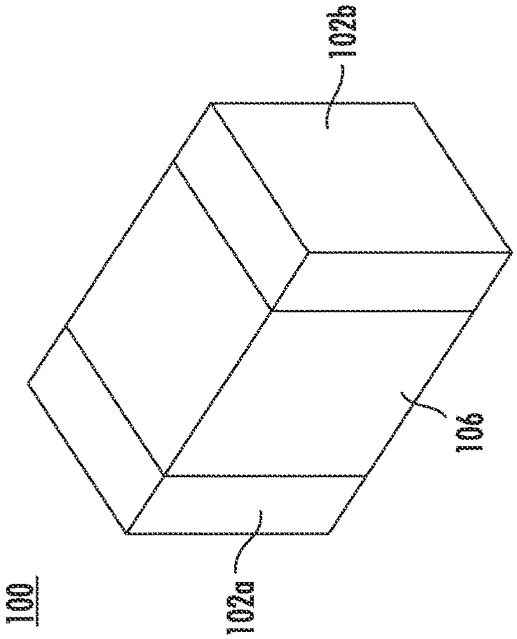
FIG. 1B (PRIOR ART)
FIGS. 1A-1C are diagrams illustrating a chip fuse, in accordance with the prior art.
Figure 1A:
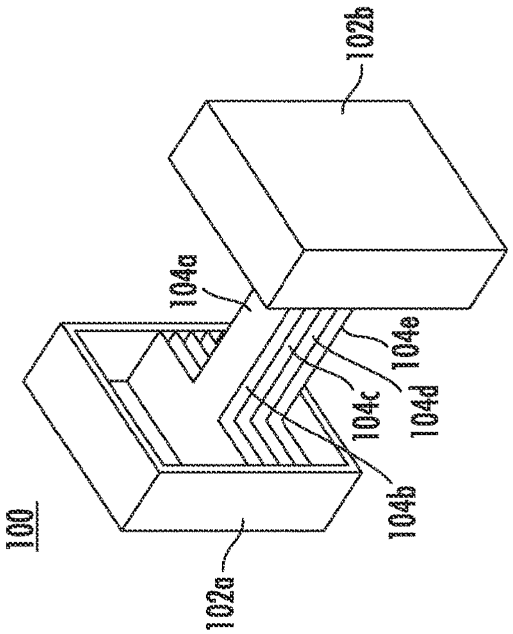
FIG. 1A (PRIOR ART)
Figure 1C:
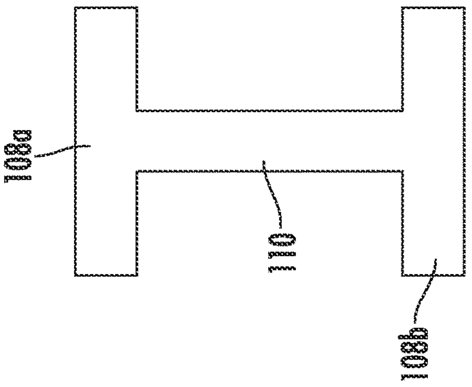
FIG. 1C (PRIOR ART)

FIGS. 1A-1C are representative drawings of a chip fuse 100, according to the prior art. FIG. 1A is an interior view of the chip fuse 100, FIG. 1B is an exterior view of the chip fuse 100, and FIG. 1C is an overhead view of a fuse element layer of the chip fuse 100. The chip fuse 100 features a pair of terminals 102*a* and 102*b* as well as multiple fuse element layers (collectively, “terminals 102”). In this example, there are five fuse element layers, 104*a*, 104*b*, 104*c*, 104*d*, and 104*e* (collectively, "fuse element layers 104"), although there could be more or fewer layers.

FIG. 1A shows that the fuse element layers 104, similar in size and shape, are stacked on top of one another to form a matrix of fuse element material. The fuse element layers 104 and the terminals 102 are made from an electrically conductive material. Each of the fuse element layers 104 may be separated by a substrate layer (not shown). A package 106, shown in FIG. 1B, contains sufficient space inside which the fuse element layers 104 are disposed and protected. The package 106 is typically made of ceramic but may be constructed of other materials.

As shown in FIG. 1C, the fuse element layers 104 are shaped like a roman numeral I, with each layer having terminal portions 108*a* and 108*b* and fuse element portion 110 (collectively, "terminal portions 108"). The length and width of the terminal portions 108 and fuse element portion 110 of the fuse element layers 104 may vary, although the terminal portions 108 typically have the same dimensions. Because it features a matrix of fuse element layers 104 that utilize a single fuse element (fuse element portion 110), the chip fuse 100 may also be referred to herein as a single-fuse element chip fuse 100.

Figure 2B:
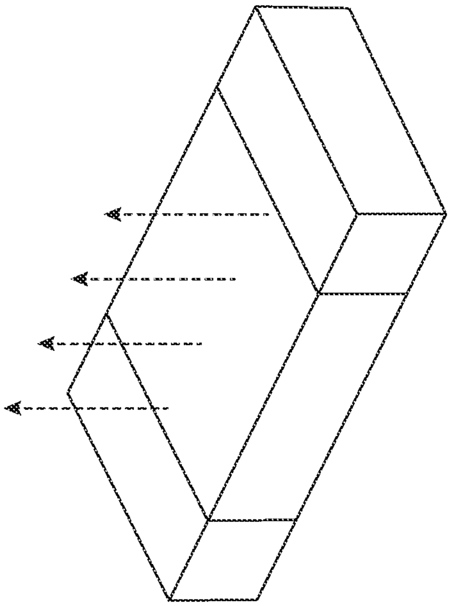
FIG. 2B (PRIOR ART)
FIGS. 2A-2B are diagrams relating to the chip fuse of FIGS. 1A-1C, in accordance with the prior art.
Figure 2A:
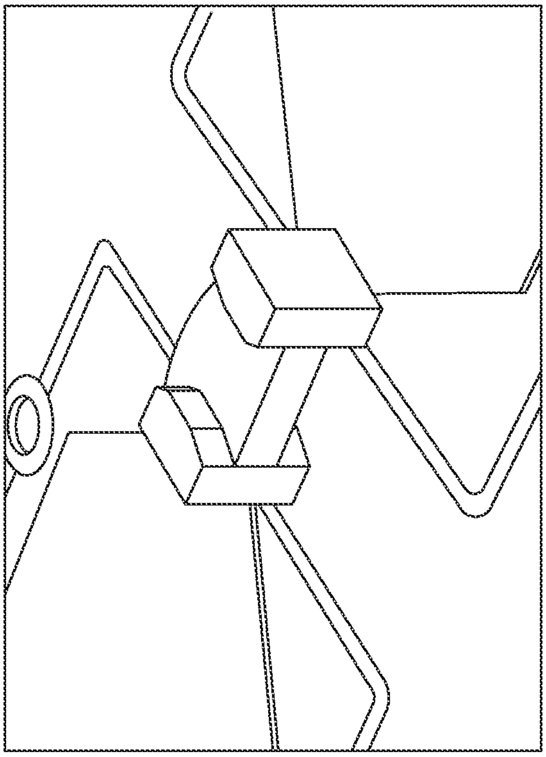
FIG. 2A (PRIOR ART)

There are drawbacks to the design of the single-fuse element chip fuse 100. By having a single fuse element portion 110 in each of the fuse element layers 104, a relatively large proportion of energy during an overcurrent or overtemperature event distributes in an upward direction rather than along the sides of the package. FIGS. 2A and 2B illustrate this phenomenon. FIG. 2A is a photograph of a blown single-fuse element chip fuse on a printed circuit board while FIG. 2B is a representative drawing of the single-fuse element chip fuse. When the fuse element array breaks, a proportion of energy is distributed upward (FIG. 2B), causing undesirable ruptures or cracks to the package (FIG. 2A). The upward movement of the blown fuse element may result in a debris field disposed between the two terminals. Thus, although the fuse is ruptured, current continues to flow across the chip fuse.

Figure 3B:
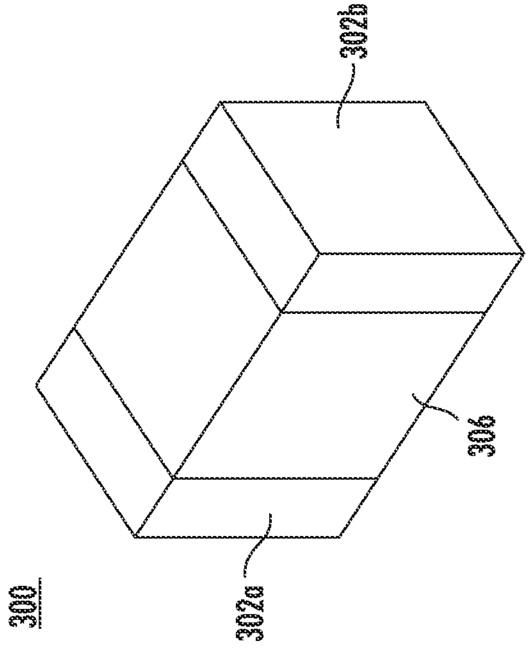
FIGS. 3A-3C are diagrams illustrating a chip fuse, in accordance with exemplary embodiments.
Figure 3C:
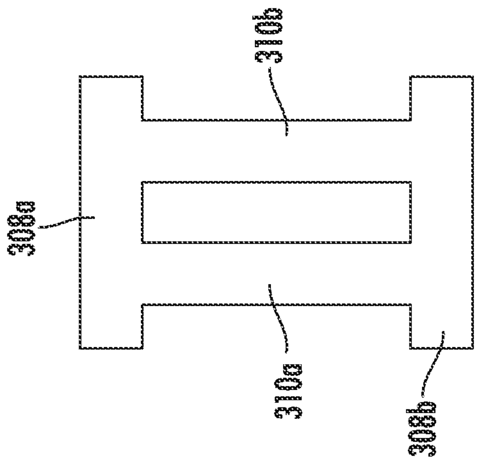
Figure 3A:
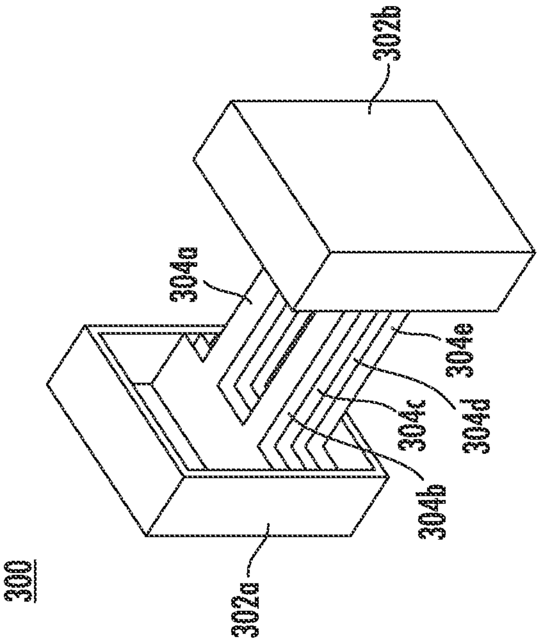

FIGS. 3A-3C are representative drawings of a chip fuse 300, according to exemplary embodiments of the present disclosure. FIG. 3A is an interior view of the chip fuse 300, FIG. 3B is an exterior view of the chip fuse, and FIG. 3C is an overhead view of one of the fuse element layers of the chip fuse. The chip fuse 300 features a pair of terminals 302*a* and 302*b* (collectively, "terminals 302") as well as multiple fuse element layers. In this example, there are five fuse element layers, 304*a*, 304*b*, 304*c*, 304*d*, and 304*e* (collectively, "fuse element layers 304"), although there could be more or fewer layers. Where FIG. 1A showed a 1×5 array, FIG. 3A shows a 2×5 array of fuse element layers.

FIG. 3A shows that the fuse element layers 304, similar in size and shape, are stacked on top of one another to form a matrix of fuse element material. In exemplary embodiments, the terminals 302 are rectangular cube-shaped and made from an electrically conductive material such as silver, nickel, tin, or combinations of these materials. The silver termination is similar to the fusible silver element because both come from a "paste" material consistency that is sintered together with the ceramic. Only the silver terminals are plated with nickel and tin in succeeding processes. The silver fuse element, now being covered and sandwiched between each of the fuse element layers 304 may be separated by a ceramic layer (not shown). A package 306, shown in FIG. 3B, provides a cavity inside which the fuse element layers 304 are disposed and protected. In exemplary embodiments, the package 306 is made of ceramic.

As shown in FIG. 3C, the fuse element layers 304 are shaped like a roman numeral II, with each layer having terminal portions 308*a* and 308*b* and fuse element portions 310*a* and 310*b* (collectively, "terminal portions 308" and "fuse element portions 310"). The length and width of the terminal portions 308 and fuse element portions 310 of the fuse element layers 304 may vary. In exemplary embodiments, the terminal portions 308*a* and 308*b* of each fuse element layer 304 are sized to fit and be secured into respective terminals 302*a* and 302*b* of the chip fuse 300.

Because it features a matrix of fuse element layers 304 that utilize a pair of fuse elements (fuse element portions 310), the chip fuse 300 may also be referred to herein as a dual-fuse element chip fuse 300. In exemplary embodiments, the chip fuse 300 includes thinner and narrower fuse element portions 310, as compared to the fuse element portion 110 of the chip fuse 100, arranged in a matrix along multiple layers of substrates.

When a fuse ruptures, there is an arc that occurs and a debris path of material is left inside the fuse cavity, which may be burned element carbonized components, and so on. One of the objectives of fuse design is to ensure that, when the fuse blows, the debris path that is formed does not allow re-arcing to occur. In exemplary embodiments, by splitting the fuse element layers 304 into two thinner, narrower fuse elements, relative to the fuse element layers 104, the debris path is to the sides of the package 306 rather than above the package, as with the chip fuse 100 (see, e.g., FIGS. 2A-2B).

In exemplary embodiments, each fuse element layer 304 has a determined geometry and orientation. This means the width of each fuse element and the spacing between each fuse element are carefully considered. Element thickness is also a consideration, as thickness also contributes to the overall mass. Also, part of the determined geometry and orientation are the electrical requirements of the chip fuse 300, and, to the extent possible, ensuring that the fuse package stays intact during the short circuit event.

Figure 4B:
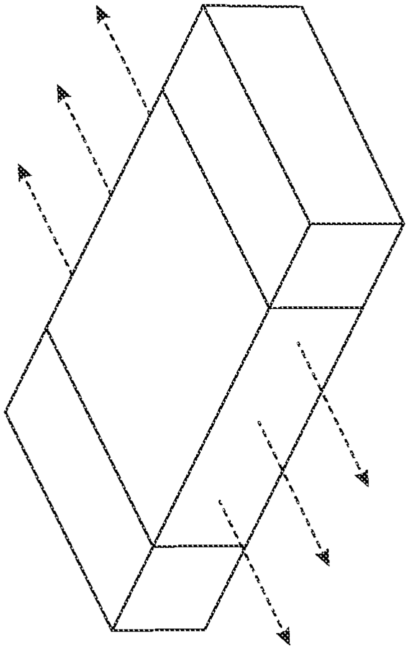
FIGS. 4A-4B are diagrams relating to the chip fuse of FIGS. 3A-3C, in accordance with exemplary embodiments.
Figure 4A:
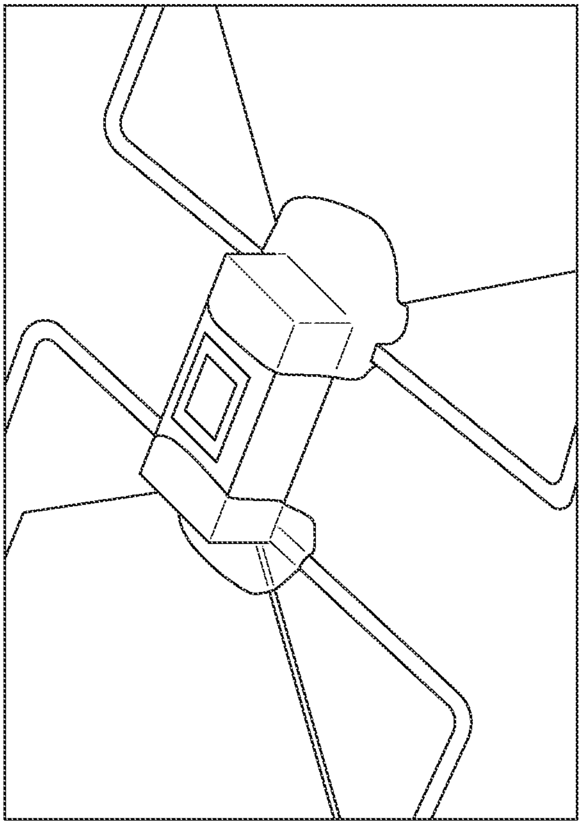

In contrast to the single-fuse element chip fuse 100, the dual-fuse element chip fuse 300 provides a benefit, namely in helping to distribute energy to the sides of the package 306 rather than through the top of the package. FIGS. 4A and 4B illustrate what happens when a dual-fuse element chip fuse is blown. FIG. 4A is a photograph of a dual-fuse element chip fuse on a printed circuit board while FIG. 4B is a representative drawing of the dual-fuse element chip fuse. When the fuse element array breaks, energy is distributed to either side of the package, rather than above the package (FIG. 2B). In some embodiments, with the change in direction of energy flow during the breakage event, the package damage is minimal (FIG. 4A). The dual fuse element design of the fuse element thus helps to distribute the energy to the sides of the package, which favors venting, as opposed to ruptures or cracks. In exemplary embodiments, splitting the fuse element layers 304 into smaller fuse elements allows the chip fuse 300 to open faster (relative to the single-fuse element fuse element layers 104) because of the narrower, thinner cross-section of the chip fuse. Thus, in exemplary embodiments, energy is dispersed more quickly and yet the package remains intact, compared to the legacy chip fuse 100.

The chip fuse 300 thus features a design with elements arranged in a matrix along multiple layers of substrates. Although five fuse element layers 304 are shown in FIG. 3A, there may be more or fewer, depending on at least the rating and size requirements of the fuse. Further, in exemplary embodiments, the determined geometry and orientation of each fuse element layer 304 allows the chip fuse 300 to achieve both higher Ft characteristics and breaking capacities, relative to comparably rated single-fuse element chip fuses.

In addition to varying the number of fuse element layers 304, the number of fuse elements of each fuse element layer are varied, in exemplary embodiments, to achieve even better $I^2t$ characteristics and breaking capacities, in exemplary embodiments. A chip fuse having three fuse elements for each fuse element layer (triple-fuse element chip fuse), four fuse elements for each fuse element layer (quadruple-fuse element chip fuse), and so on, are also possible, as the number of fuse elements and the number of layers of the fuse element are subject to the size limitations of the chip packaging and the desired rating for the fuse.

Figure 5A:
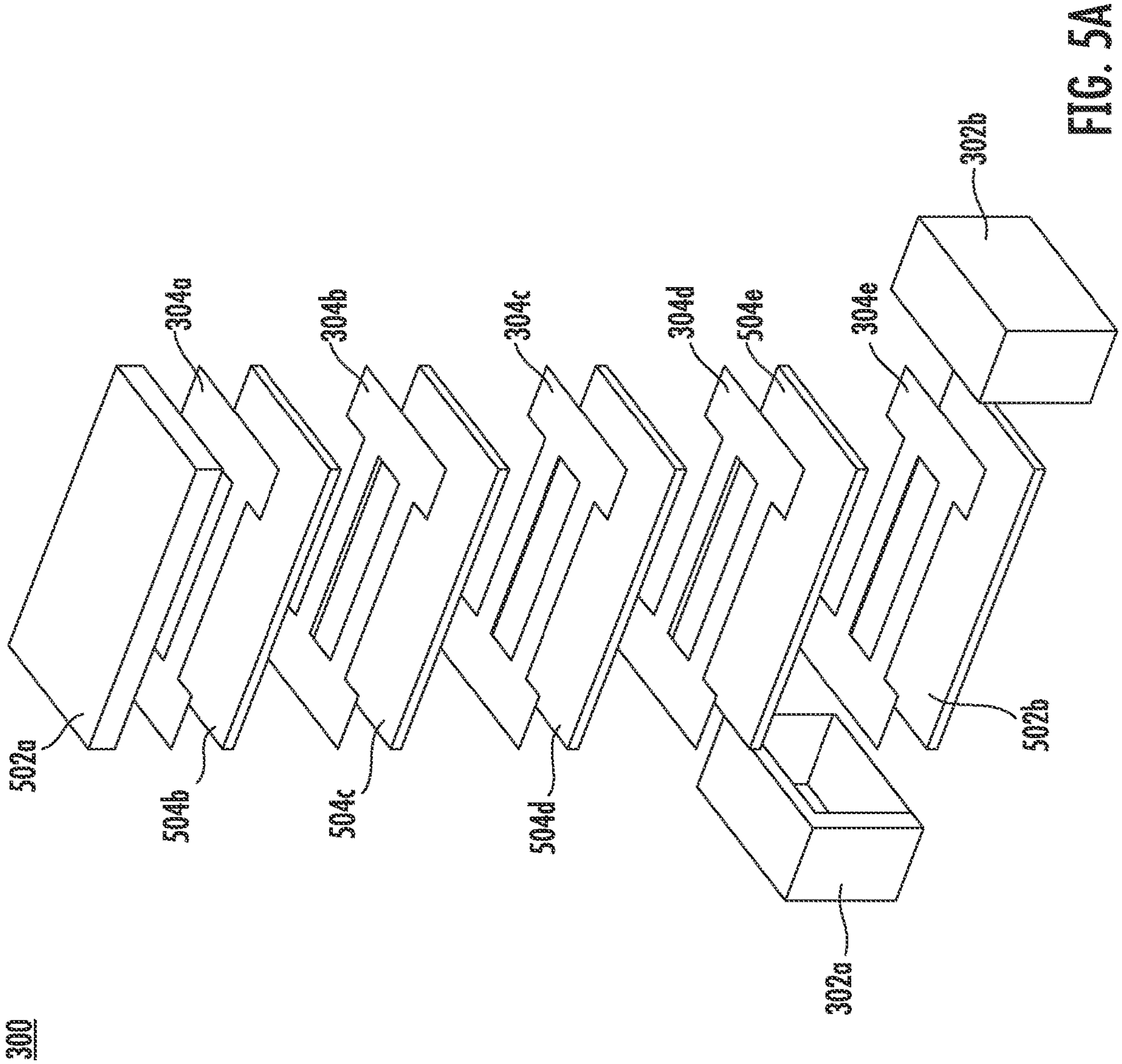
FIGS. 5A-5B are additional diagrams of the chip fuse of FIGS. 3A-3C, in accordance with exemplary embodiments.
Figure 5B:
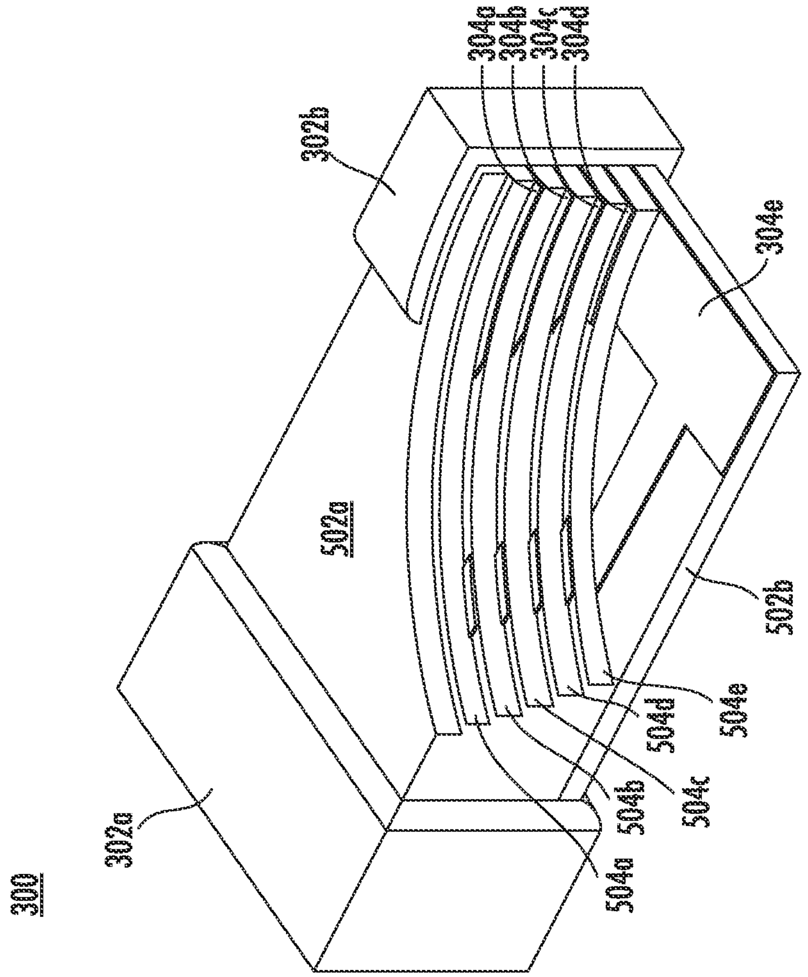

FIGS. 5A-5B are more detailed drawings of the chip fuse 300 of FIGS. 3A-3C, according to exemplary embodiments. FIG. 5A is an exploded view and FIG. 5B is a cutaway view of the chip fuse 300. The terminals 302 and the five fuse element layers 304 are shown as before. In exemplary embodiments, the terminals 302 are made of an electrically conductive material such as silver, nickel, tin, or combinations of these materials. Additionally, in exemplary embodiments, the chip fuse 300 features a low temperature co-fired ceramic (LTCC) cover 502*a* disposed at one end of the chip fuse 300 and a second LTCC cover 502*b* disposed at an opposite end of the chip fuse (collectively, "LTCC covers 502"). In the exploded view (FIG. 5A), the LTCC cover 502*a* is at the top of the chip fuse 300 and the LTCC cover 502*b* is at the bottom of the chip fuse.

Further, in exemplary embodiments, the chip fuse 300 includes LTCC intermediate layers 504*a*, 504*b*, 504*c*, 504*d*, and 504*e* (collectively, "LTCC intermediate layers 504"). The LTCC covers 502 and the LTCC intermediate layers 504 constitute the "layers of substrates", or "ceramic layers" referred to herein as part of the chip fuse 300. In exemplary embodiments, the LTCC covers 502 and LTCC intermediate layers 504 are sized to provide a protective layer between each fuse element layer 304. Thus, the LTCC covers 502 and LTCC intermediate layers 504 have dimensions that are at least as large, and may be slightly larger, than the dimensions of the fuse element layers 304. In FIG. 5A, the LTCC covers 502 and LTCC intermediate layers 504 are rectangular shape, though this is not meant to be limiting.

In exemplary embodiments, the elements of the chip fuse 300, as viewed in FIG. 5A, are disposed as follows: LTCC cover 502*a* is disposed at the top and adjacent to fuse element layer 304*a*; LTCC intermediate layer 504*b* is sandwiched between fuse element layer 304*a* and fuse element layer 304*b*; LTCC intermediate layer 504*c* is disposed adjacent and beneath fuse element layer 304*b*; fuse element layer 304*c* is sandwiched between LTCC intermediate layer 504*c* and LTCC intermediate layer 504*d*; fuse element layer 304*d* is disposed adjacent and below LTCC intermediate layer 504*d*; LTCC intermediate layer 504*e* is sandwiched between fuse element layer 304*d* and fuse element layer 304*e*; and LTCC cover 502*b* is disposed adjacent and below fuse element layer 304*e*. In exemplary embodiments, the LTCC covers 502 and the LTCC intermediate layers 504 are rectangular in shape, with the same length and width.

Once the arrangement of LTCC cover layers 502, fuse element layers 304, and LTCC intermediate layers 504 shown in FIG. 5A are collapsed onto one another, the terminals 302*a* and 302*b* are formed over the sandwiched layers, as in FIG. 5B. The open rectangular-cube box shape of the terminals 302 are sized so that the ends of the layers 502, 504, and 304 can fit therein. In a non-limiting example, one process flow for sandwiching the fuse elements between layers of LTCC is: 1) firing or sintering to solidify the "soft" LTCC and silver element paste; 2) dipping of the silver termination paste on the sides; 3) firing or sintering to solidify the "soft" termination paste; and 4) nickel and tin plating.

In FIG. 5A, there is no LTCC intermediate layer 504*a* in between the LTCC cover sheet 502*a* and the fuse element layer 304*a*, whereas, in FIG. 5B, LTCC intermediate layer 504*a* is sandwiched between the LTCC cover sheet 502*a* and the fuse element layer 304*a*. Other arrangements are possible, with the thinner and narrower fuse element layers 304 being arranged in a matrix along multiple layers of substrates (LTCC cover sheets 502 and LTCC intermediate layers 504).

Figure 6B:
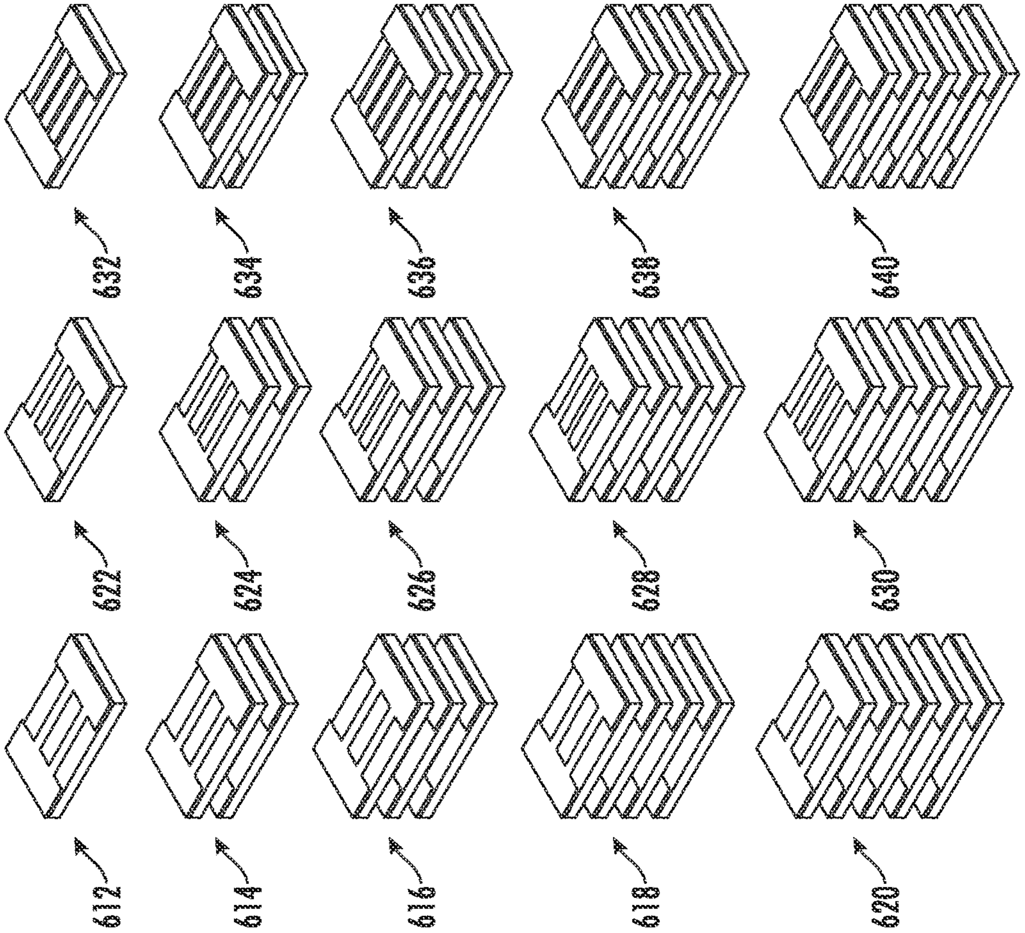
FIG. 6B includes diagrams of chip fuse arrays, in accordance with exemplary embodiments.
Figure 6A:
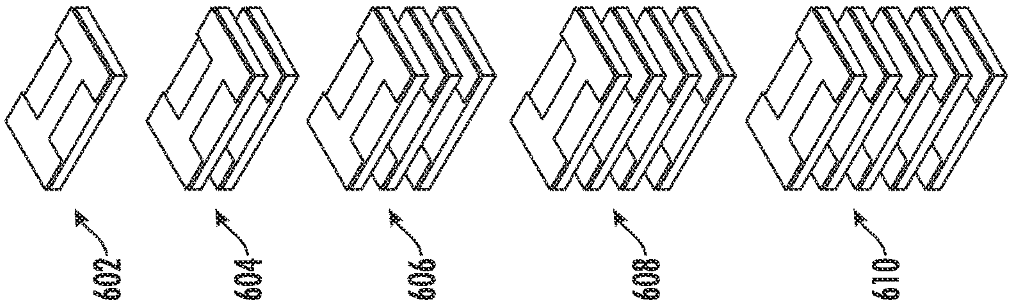
FIG. 6A (PRIOR ART)
FIG. 6A includes diagrams of chip fuse arrays, in accordance with the prior art.

FIG. 6A features five single-fuse element chip fuse arrays, according to the prior art. Chip fuse 602 features a single fuse element layer; chip fuse 604 features two fuse element layers; chip fuse 606 features three fuse element layers; chip fuse 608 features four fuse element layers; and chip fuse 610 features five fuse element layers. Despite having a different number of fuse element layers, these single-fuse element chip fuses 602-610 nevertheless share the problem of rupturing or cracking to the package once the fuse blows, due to the presence of a single fuse element in each fuse element layer.

FIG. 6B is a representative drawing of fifteen multiple-fuse element chip fuse arrays, according to exemplary embodiments. The introduction of thinner and narrower elements in the multiple-fuse element chip fuses, as compared to the prior art chip fuse 100, eliminates the problem of upward energy distribution that result in cracks and ruptures to the package. The dual-fuse element portions 310 of the fuse element layers 304 illustrated in FIGS. 3A and 5A-5B, can be extended to three fuse elements, four fuse elements, five fuse elements, and more, depending in part on the available footprint of the chip fuse and its rating.

In FIG. 6B, five dual-fuse element chip fuses are shown: chip fuse 612 features a single fuse element layer; chip fuse 614 features two fuse element layers; chip fuse 616 features three fuse element layers; chip fuse 618 features four fuse element layers; and chip fuse 620 features five fuse element layers. By having two fuse elements in each fuse element layer, the dual-fuse element chip fuses perform better than the single-fuse element chip fuses of FIG. 6A, in some embodiments.

In FIG. 6B, five triple-fuse element chip fuses are shown: chip fuse 622 features a single fuse element layer; chip fuse 624 features two fuse element layers; chip fuse 626 features three fuse element layers; chip fuse 628 features four fuse element layers; and chip fuse 630 features five fuse element layers. By having three fuse elements in each fuse element layer, the triple-fuse element chip fuses perform better than the single-fuse element chip fuses of FIG. 6A, in some embodiments.

In FIG. 6B, five quadruple-fuse element chip fuses are shown: chip fuse 632 features a single fuse element layer; chip fuse 634 features two fuse element layers; chip fuse 636 features three fuse element layers; chip fuse 638 features four fuse element layers; and chip fuse 640 features five fuse element layers. By having four fuse elements in each fuse element layer, the quadruple-fuse element chip fuses perform better than the single-fuse element chip fuses of FIG. 6A, in some embodiments.

FIGS. 7A-7D are representative drawings of fuse elements for four equally sized fuse footprints, according to exemplary embodiments. Each fuse element 704*a*, 704*b*, 704*c*, and 704*d* has the same width, w (collectively, "fuse elements 704"). Thus, the four fuse elements 704 have the same footprint. Fuse element 704*a* has a single fuse element portion 710*a* having a width, $w_1$; fuse element 704*b* has two fuse element portions 710*b* disposed parallel to one another, each having a width, $w_2$; fuse element 704*c* has three fuse element portions 710*c* disposed parallel to one another, each having a width, $w_3$; and fuse element 704*d* has four fuse element portions 710*d* disposed parallel to one another, each having a width, $w_4$. In exemplary embodiments, the widths of the fuse element portions decrease as the number of fuse element portions increases, with $w_1>w_2>w_3>w_4$. Thus, for the same chip footprint, as the number of fuse element portions increases, the size of the fuse elements decreases.

Many variations of the dimensions shown in FIGS. 7A-7D may be made for the fuse elements 704, as the illustrations are not meant to be limiting. For example, the two fuse element portions 710*b* in the fuse element 704*b* are the same width, $w_2$; for fuse element 704*c*, the fuse element portions 710*c* are the same width, $w_3$; and for fuse element 704*d*, the fuse element portions 710*d* are the same width, $w_4$. However, there is no requirement that the n fuse element portions for an n-fuse element fuse element be the same width.

Further, the spacing between fuse element portions may vary. If fuse element 704*b* is designed to be symmetrical, then distance $d_1$ would equal distance $d_2$, although distance $d_3$ may be different. However, the fuse element 704*b* may be asymmetrical, to satisfy the determined geometry and orientation of the fuse element. For the fuse element 704*c*, the distances between fuse element portions 710*c* may be the same, e.g., $d_4=d_5=d_6=d_7$, or $d_4=d_7$ and $d_5=d_6$ but $d_4\neq d_5$, as two examples of a symmetrical arrangement. Or the fuse element 704*c* may be asymmetrical, with $d_4\neq d_5\neq d_6\neq d_7$. The determined geometry and orientation of the fuse element, whether dual-fuse element portion, triple-fuse element portion, quadruple-fuse element portion, and n-fuse element portion, for integer n, may vary.

In exemplary embodiments, the thickness of the fuse element portions may also be varied, with a quadruple-fuse element fuse element having thinner fuse elements than a dual-fuse element fuse element. It may be the case that the same volume of electrically conductive material is used to manufacture the quadruple-fuse element fuse element as the dual-fuse element fuse element. Thus, the fuse element portions of the quadruple-fuse element fuse element may be both thinner in terms of width and thickness than the fuse element portions of the dual-fuse element fuse element.

Figure 7A:
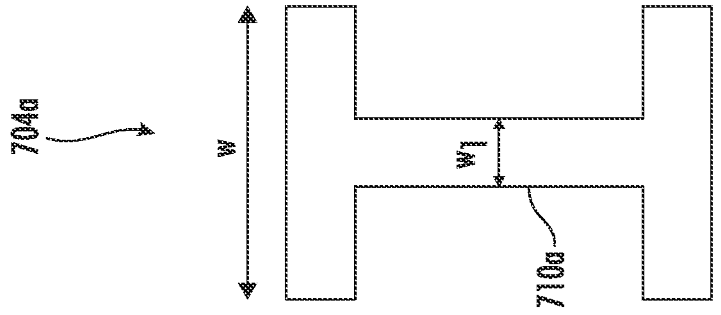
FIGS. 7A-7D are diagrams of fuse elements with different numbers of fuse element portions, in accordance with exemplary embodiments.
Figure 7B:
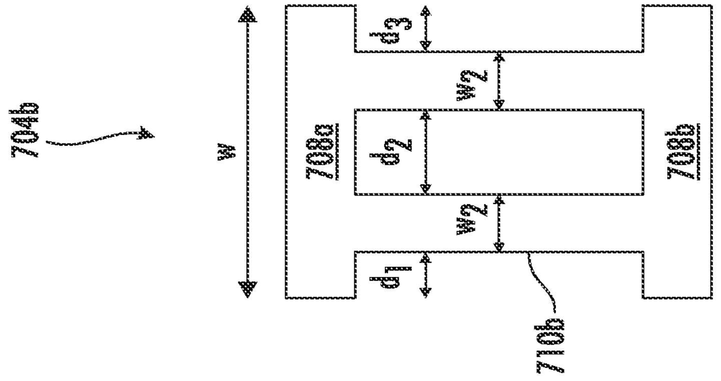
Figure 7C:
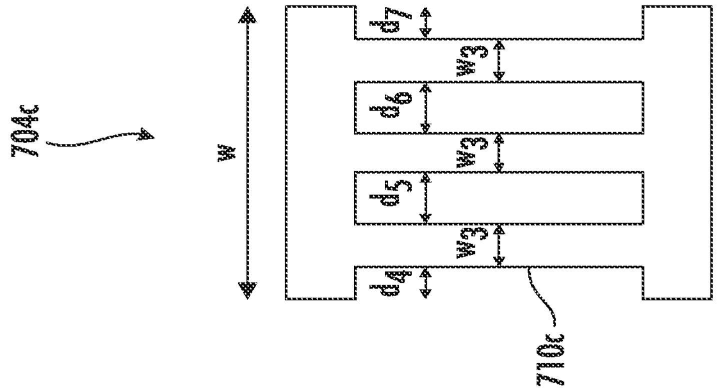
Figure 7D:
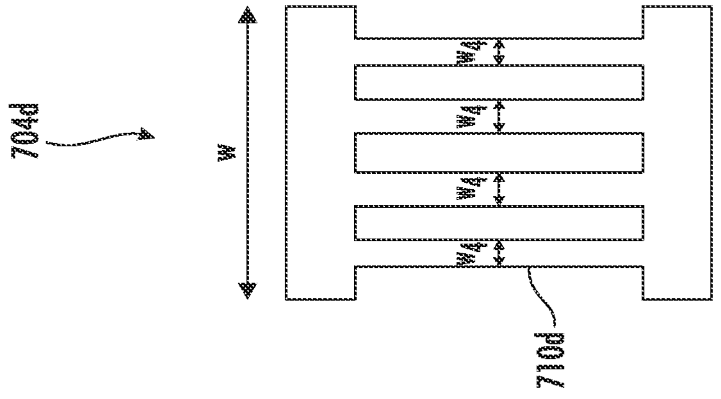

Terminal portions 708*a* and 708*b* of the dual-fuse element fuse element 704*b* are shown in FIG. 7B. The single-fuse element, triple-fuse element, and quadruple-fuse element fuse elements similarly include terminal portions. In exemplary embodiments, the fuse element portions 710*b* are orthogonal to and disposed between the terminal portions 708*a* and 708*b*. In FIG. 7B, the fuse element portions 710*b* are rectangular in shape, providing a straight-line path between terminals 708*a* and 708*b*. In non-limiting examples, the fuse element portions 710*b* may alternatively be shaped differently, such as serpentine (curved or S-shaped), zigzagged, or meandering.

Figure 8:
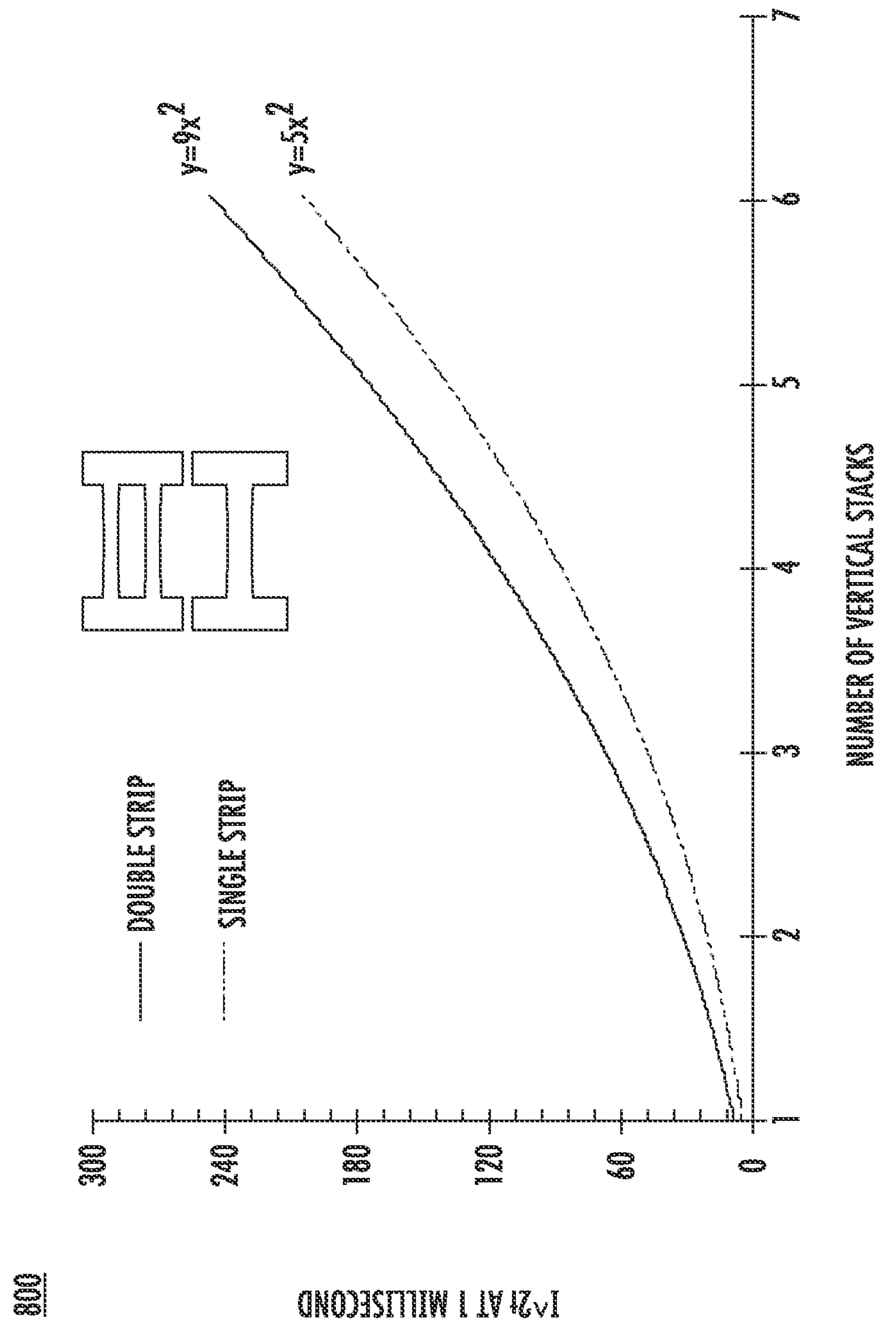
FIG. 8 is a graph illustrating a fuse characteristic for two chip fuses, in accordance with exemplary embodiments.

FIG. 8 is a graph 800 comparing a single-fuse element fuse element with a dual-fuse element fuse element in a chip fuse, according to exemplary embodiments. The graph 800 plots the number of vertical stacks in the x axis and the $I^2t$ energy value at 1 millisecond in the y axis (in amperes per second). A third component of the graph 800 is the number of fuse elements which, in this case, is either one or two. $I^2t$ is measured by looking for the current that opens the fuse within the 1 millisecond time. $I^2t$ is a measure of the energy value, a measure of heat that the fuse requires for it to open at 1 millisecond, so that's what the vertical axis means.

For a single-fuse element chip fuse such as the chip fuse 100, by adding multiple fuse elements to the fuse in an array, there is an exponential correlation (an example given as $y=5x^2$ for one specific design). This one example correlation was empirically determined. However, there may be many different correlations, depending on the specific fuse design. For the dual-fuse element chip fuse such as the chip fuse 300, the $I^2t$ value is almost doubled, from $5x^2$ to $9x^2$. Thus, there is an exponential relationship between the number of stacks and the $I^2t$ value. In exemplary embodiments, the $I^2t$ value continues to increase with a triple-fuse element chip fuse, a quadruple-fuse element chip fuse, and so on. Having the layers stacked vertically also exponentially increases $I^2t$, together with fuse rating, in exemplary embodiments.

Further, in exemplary embodiments, although the $I^2t$ values increase with the use of a higher number of thinner and narrower fuse elements arranged in a matrix along multiple layers of substrates, there is not a diminution in breaking capacity. Thus, by controlling the geometry and orientation of each element fuse element for each layer, the design allows the fuse to achieve both high $I^2t$ values and high breaking capacities. Having a fuse element geometry with a reduced cross-sectional area translates to less energy required to cut off the electrical connection, giving the n-fuse element chip fuse fast-acting properties, relative to single-fuse element chip fuses.

The n-fuse element chip fuse also reimagines parallel mounting of lower rating fuses by condensing them into a single fuse package, resulting in a reliable fuse package with defined resistance limits and dimensional controls for each layer, instead of having the user manually sort individual lower rating fuses with similar resistances.

Table 1 provides another comparison between the 1×5 array of the chip fuse 100 versus the 2×5 array of the chip fuse 300, according to exemplary embodiments. The design of each chip fuse starts with a 250 A@24 VDC requirement for the short circuit, shown in the second column. For the 1×5 array (chip fuse 100), the body ruptures while, for the 2×5 array (chip fuse 300), the short circuit results in sparks and vents until 360 A@24 VDC, which is an improvement over the 1×5 array (sparks and vents are an acceptable result while body rupture is not). Further, the $I^2t$ value, at 175 $A^2s$@1 msec, is higher for the 2×5 array than for the 1×5 array, which is 138 $A^2s$@1 msec, as shown in the third column of Table 1.

Most fuses have one or multiple specified opening time limits at specified overcurrent conditions (or overload gates, as commonly called), a basic requirement. A 250% overload gate is equivalent to 2.5 times the rated current of the fuse. The 1×5 array and 2×5 array are specified to open to five seconds maximum only. For the 2×5 array, there is a slight increase in opening time, 0.7 seconds, over the 1×5 array, which has an opening time of 0.5 seconds, where $I_n$ is the rated current. Both values are well within the overload specification.

TABLE 1

Comparison of 1 × 5 array and 2 × 5 array

| | short circuit | $I^2t$ | opening time |
|---|---|---|---|
| 2 × 5 array | sparks & vents until 360A@24VDC | 175 $A^2s$ @ 1 msec | 0.7 sec average when tested @ 250% $I_n$ |

TABLE 1-continued

| Comparison of 1 × 5 array and 2 × 5 array | | | |
|---|---|---|---|
| | short circuit | $I^2t$ | opening time |
| 1 × 5 array | body ruptures in 250A @ 24 VDC | 138 $A^2s$ @ 1 msec | 0.5 sec average when tested @ 250% $I_n$ |

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A chip fuse comprising:
- a plurality of substrate layers;
- a plurality of fuse element layers, each fuse element layer of the plurality of fuse element layers being sandwiched between two substrate layers of the plurality of substrate layers, and each fuse element layer of the plurality of fuse element layers comprising:
  - a first fuse element portion connecting between a first terminal and a second terminal;
  - a first terminal portion seated in the first terminal;
  - a second terminal portion seated in the second terminal; and
  - a second fuse element portion connecting between the first terminal and the second terminal; and
- a package enclosing the plurality of substrate layers and the plurality of fuse element layers, sides of the package being perpendicular to each of the plurality of fuse element layers between the first terminal and the second terminal, and a top of the package being parallel to the plurality of fuse element layers between the first terminal and the second terminal,
  - wherein the first fuse element portion is parallel to the second fuse element portion;
  - wherein the first terminal portion, the first fuse element portion, the second terminal portion, and the second fuse element portion are arranged in a Roman Numeral II shape; and
- wherein, when the first fuse element portion or the second fuse element portion of any of the plurality of fuse element layers ruptures, a geometry, an orientation, and a thickness of each fuse element layer of the plurality of fuse element layers causes energy to distribute to the sides of the package in lieu of the top of the package.

2. The chip fuse of claim 1, wherein the first fuse element portion and the second fuse element portion form electrical connections between the first terminal and the second terminal.

3. The chip fuse of claim 1, wherein the first terminal and the second terminal are rectangular cube shaped.

4. The chip fuse of claim 1, wherein each substrate layer of the plurality of substrate layers is rectangular.

5. The chip fuse of claim 1, each fuse element layer of the plurality of fuse element layers further comprising a third fuse element portion connecting between the first terminal and the second terminal, the first fuse element portion having a first dimension, the second fuse element portion having a second dimension, and the third fuse element portion having a third dimension.

6. The chip fuse of claim 5, wherein the first dimension is equal to the second dimension and the third dimension.

7. The chip fuse of claim 5, wherein the first dimension is not equal to the second dimension.

8. The chip fuse of claim 5, the first fuse element portion being a first width from the second fuse element portion and the second fuse element portion being a second width from the third fuse element portion, wherein the first width equals the second width.

9. A chip fuse comprising:
- a first terminal disposed on a first end of a fuse element array; and
- a second terminal disposed on a second end of the fuse element array opposite the first end;
- the fuse element array comprising a plurality of layers disposed in a stacked arrangement, each layer of the plurality of layers comprising:
  - a first terminal portion disposed within the first terminal, the first terminal being opened on one side for receiving the first terminal portion;
  - a second terminal portion disposed within the second terminal, the second terminal being opened on one side for receiving the second terminal portion;
  - a first fuse element portion orthogonal to and extending between the first terminal portion and the second terminal portion; and
  - a second fuse element portion orthogonal to and extending between the first terminal portion and the second terminal portion,
  - wherein the first fuse element portion is adjacent the second fuse element portion;
  - wherein the first terminal portion, the second terminal portion, the first fuse element portion, and the second fuse element portion comprise a Roman Numeral II shape; and
- wherein, when the first fuse element portion or the second fuse element portion of any of the plurality of layers ruptures, a geometry, an orientation, and a thickness of each layer of the plurality of layers causes energy to distribute to sides of the fuse element array in lieu of a top of the fuse element array.

10. The chip fuse of claim 9, further comprising a first intermediate layer disposed between a first layer and a second layer of the plurality of layers, wherein the first intermediate layer is a low temperature co-fired ceramic.

11. The chip fuse of claim 10, further comprising a cover disposed above the first layer, wherein the first layer is sandwiched between the cover and the first intermediate layer.

12. The chip fuse of claim 11, wherein the cover is a low temperature co-fired ceramic.

13. The chip fuse of claim 11, further comprising:
- a third layer of the plurality of layers;
- a second intermediate layer;
- a third intermediate layer; and
- a fourth layer of the plurality of layers;
- wherein the second intermediate layer is sandwiched between the second layer and the fourth layer;
- wherein the third layer is sandwiched between the second intermediate layer and the third intermediate layer; and wherein the third intermediate layer is sandwiched between the third layer and the fourth layer.

14. The chip fuse of claim 9, wherein the first fuse element portion is parallel to the second fuse element portion.

15. The chip fuse of claim 9, the first fuse element portion having a first width and the second fuse element portion having a second width.

16. The chip fuse of claim 15, wherein the first width is equal to the second width.

17. The chip fuse of claim 15, wherein the first width is not equal to the second width.

18. The chip fuse of claim 9, each layer of the plurality of layers further comprising a third fuse element portion orthogonal to and extending between the first terminal portion and the second terminal portion, wherein the third fuse element portion is adjacent the second fuse element portion.

19. The chip fuse of claim 18, each layer of the plurality of layers further comprising a fourth fuse element portion orthogonal to and extending between the first terminal portion and the second terminal portion, wherein the fourth fuse element portion is adjacent the third fuse element portion.

20. The chip fuse of claim 1, wherein the package stays intact during a short circuit event.

* * * * *